DIGITAL PHASE SHIFTER

Filed Sept. 26, 1967

INVENTORS C. W. FARROW
W. J. LAWLESS
J. MARUSCSAK
BY J. P. Kearns
ATTORNEY

3,529,250
DIGITAL PHASE SHIFTER

Cecil W. Farrow, Monmouth Hills, William J. Lawless, Middletown, and Joseph Maruscsak, Howell Township, Monmouth County, N.J., assignors to Bell Telephone Laboratories, Incorporated, Murray Hill and Berkeley Heights, N.J., a corporation of New York Filed Sept. 26, 1967, Ser. No. 670,715
Int. Cl. H03b 3/04
U.S. Cl. 328—155 5 Claims

ABSTRACT OF THE DISCLOSURE

A carrier recovery system in which a digital comparator is employed to compare a number stored in an up-down counter to a number in a multistate counter which is counting down from an oscillator to provide a phase shifted output signal. The value stored in the up-down counter is set during an initial start-up sequence by comparing the locally generated carrier to a received carrier signal. If, during normal transmission, the received signal is lost, the oscillator continues to drive the multistate counter so that upon return of the received signal a properly phased locally generated carrier can be restored without resorting to a second start-up sequence.

FIELD OF THE INVENTION

This invention relates to a digital phase shifting circuit and particularly to a digital phase shifting circuit which continues to provide a properly phase-shifted output signal for a predetermined minimum time after the loss of a driving input signal.

BACKGROUND OF THE INVENTION

In some data transmission systems, such as a vestigial sideband (VSB) data transmission system, a pair of pilot tones are transmitted along with the information signals so that a demodulating carrier signal may be generated by circuits at a receiver. Typically, the two pilot tones are mixed to provide a difference frequency signal. The difference frequency signal is then divided down by other circuits to an integrally related lower frequency signal for mixing with one of the pilot tones to provide the demodulating carrier signal.

During an initial system start-up procedure, a carrier signal may be transmitted along with other test signals to adjust carrier recovery circuits in the receiver, whereby the phase of the demodulating carrier signal is adjusted for proper demodulation. During normal transmission after the initial start-up period, the carrier recovery circuit maintains a constant phase relationship between the demodulating carrier signal and the received pilot tones. If, however, a momentary loss of the pilot tones occur, the dividing circuit in the carrier recovery system can then provide signals of indeterminate phase requiring repetition of the start-up procedure to regain proper phasing.

A system presently available to overcome phase ambiguity after a momentary loss of pilot tones includes a resettable counter circuit for dividing down an applied signal and an inertial circuit driven by the output of the counter circuit for providing a reset pulse. The reset pulse normally occurs when the counter is already reset so that the inertial circuit only resets the counter circuit after a brief interruption of the applied signal. This system, while satisfactory for curing phase ambiguity problems for short pilot-tone drop-out periods (on the order of 50 milliseconds), has been found wanting when pilot-tone drop outs as long as one second occur.

BRIEF DESCRIPTION OF THE INVENTION

To solve this problem the present invention employs a clock signal generator to drive a multistate counting circuit phase locked to the pilot tone difference frequency signal. A digital comparator provides a coincidence signal when the multistate counting circuit attains a desired state. The coincidence signal is counted to provide a phase-locked, phase-shifted pilot tone difference frequency signal.

The phase-locked, phase-shifted pilot tone difference frequency signal is counted down to provide a lower frequency signal which is mixed with one of the pilot tones to provide the locally generated demodulating carrier signal. During an initial start-up sequence, the locally generated demodulated carrier signal is compared with a received carrier signal to provide a phase difference signal. The phase difference signal controls an up-down counter in which the desired state is stored.

If a drop out occurs, during normal signal transmission, the phase-locked loop is opened so that the local oscillator may continue to drive the multistate counting circuit thereby generating a properly phase carrier for a time related to the accuracy of the local oscillator. Such a system has been designed, employing a commercially available oscillator, in which proper phasing of the locally generated carrier is not lost even after a pilot tone drop out on the order of one second in duration.

DETAILED DESCRIPTION

Figures 1, 2:
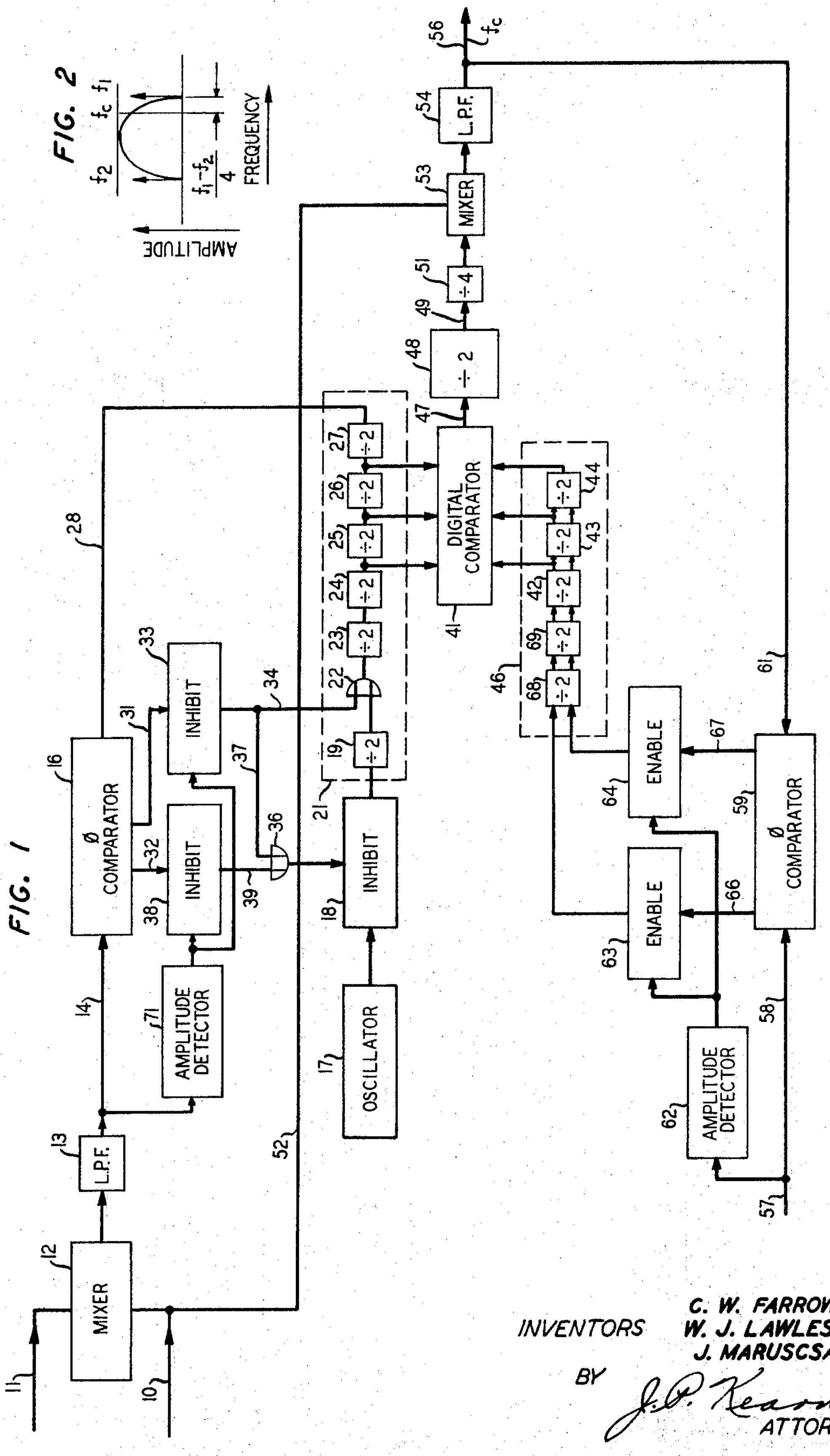
FIG. 1 is a block diagram showing the circuit organization of a system embodying the principles of this invention.
FIG. 2 is a spectral plot showing the VSB channel and two associated pilot tones.

Referring first to FIG. 2 there is seen a plot of frequency versus amplitude for signals transmitted in a VSB data transmission system. Typically, the data information modulating a carrier $f_c$ is transmitted in a channel along with band-edge pilot tones $f_1$ and $f_2$. At a receiver, carrier recovery circuitry, as shown in FIG. 1, is employed to generate a local carrier for homodyne demodulation of the received signals. The pilot tones $f_1$ and $f_2$, each having been offset an amount $\Delta f$ by the transmission medium, are derived from the received signal by circuits, not shown, and applied to input leads 10 and 11, respectively, of mixer 12. The difference frequency component of the output of mixer 12 is passed by low pass filter 13 providing a difference frequency signal independent of transmission medium offset to a first input lead 14 of phase comparator 16.

An oscillator 17, nominally set to a frequency sixty-four times the difference frequency on the lead 14 is passed by inhibit gate 18 to a first stage 19 of a multistate counter 21. The output of the first stage 19 is passed by OR gate 22 to drive the remaining five stages 23, 24, 25, 26, and 27 of the counter 21. Therefore, it is seen that the six-stage counter 21 will divide the signal from the oscillator 17 by a factor of sixty-four to provide a signal on lead 28 which is nominally equal to the difference frequency on the lead 14. The difference between the frequency on the lead 14 and the signal on the lead 28 will be due primarily to the inaccuracies of both the oscillator 17 and the oscillator from which the pilot tones are generated at the transmitter. The locally generated frequency difference signal on the lead 28 is applied to a second input of the comparator 16 to provide add and delete pulses on leads 31 and 32, respectively, when the phase of the signal on the lead 28 lags or leads, respectively, the phase of the signal on the lead 14.

The add pulses on the lead 31 are normally passed by inhibit gate 33 to be applied to OR gate 22 by lead 34 and to OR gate 36 by lead 37. The OR gate 36 provides inhibit signals to the inhibit gate 18. In this way, when the signal on the lead 28 lags the signal on the lead 14, the OR gate 22 advances the counter 21 two steps by pulsing the second stage while the OR gate 36 inhibits one cycle from the oscillator 17 so that the counter 21 is advanced one extra count to compensate for the phase difference. In contrast, when the signal on the lead 28 leads the signal on the lead 14, inhibit gate 38 normally applies delete pulses on lead 32 to OR gate 36 by lead 39 thus inhibiting one cycle from the oscillator 17. This causes the counter 21 to skip a count thereby tending to correct the phase relationship of the two above-mentioned difference frequency signals.

The output signals from counter stages 24, 25, and 26 are applied to a digital comparator 41. When counter stages 24, 25, and 26 reach a predetermined value determined by stages 42, 43, and 44 of up-down counter 46, the comparator 41 provides a coincidence signal on lead 47. The signal on lead 47 is divided by two in divide-by-two circuit 48 to provide a signal on lead 49. This signal has the same frequency as the signal on the lead 28, but is phase shifted an amount related to the predetermined value supplied to the comparator 41 by stages 42, 43, and 44 of the up-down counter 46. The phase-shifted signal is divided by four in circuit 51 and then mixed with the received signal on lead 10 for application to mixer 53 by way of lead 52. The output of mixer 53 is filtered by low-pass filter 54 to provide a locally generated carrier signal on output lead 56. It should be clear that the divide by-four circuit is provided because the carrier frequency is spaced from the pilot tone $f_1$ by a factor $$\frac{f_1-f_2}{4}$$

as indicated in FIG. 2. The factor of four in the above-mentioned expression is arbitrary and it should be clear that in a system where the carrier were spaced from the pilot tone by a distance of $$\frac{f_1-f_2}{5}$$

the divide-by-four circuit 51 would simply be replaced by a divide-by-five circuit.

To initially set the up-down counter stages 42, 43, and 44 to the proper value for setting the phase of the locally generated carrier on the lead 56, a carrier signal transmitted during an initial start up sequence is isolated by equipment at the receiver (not shown) and applied to a lead 57. This carrier signal is applied to a first input terminal 58 of a phase comparator 59 similar to the phase comparator 16. The locally generated carrier signal on lead 56 is applied to a second input terminal 61 of the phase comparator 59. The signal on the lead 57 is also applied to an amplitude detector 62 which activates enable gates 63 and 64. The gates 63 and 64 pass up-down driving pulses which appear on output terminals 66 and 67, respectively, of the phase comparator 59 when the carrier signal is present. The up-down signals are applied to the up-down counter 46 for adjusting the predetermined value supplied to the digital comparator 41 phase shifting the locally generated difference signal until the locally generated carrier signal is properly phased with respect to the received carrier signal. Two additional stages 68 and 69 are added before the stages 42, 43, and 44 of the up-down counter 46 to average short term variations.

After the start-up sequence is completed, the carrier signal no longer is received. Therefore, the amplitude detector 62 no longer activates enable gates 63 and 64 so that the up-down counter may neither be counted up nor down. The phase information stored in the significant stages 42, 43, and 44 of the up-down counter remains fixed during this normal operation. It should be understood that known circuits can be used to drive the up-down counter 46. Suitable circuits are disclosed, for example, in the copending application of D.C. Weller, Ser. No. 631,521, filed Apr. 17, 1967, and entitled "System for Phase Locking Two Pulse Trains," which could adaptively drive the up-down counter 46 during reception.

If, during normal operation, the received signal is momentarily lost, an amplitude detector 71 connected to the output of low pass filter 13 will provide an inhibit signal to inhibit gates 33 and 38 so that the multistate counting circuit 21 will merely divide the output of oscillator 17 by sixty-four without the aid of add or delete pulses. The digital comparator will provide an output on the lead 47 each time the stages 24, 25, and 26 of the multistate counter 21 provide output signals equal to the signals stored in up-down counter stages 42, 43, and 44. (If a system, such as described in the above-mentioned D. C. Weller application, were employed to drive the up-down counter, it would also be inhibited upon failure of the received signal.)

When the received signal is again restored the locally generated difference frequency signal on lead 28 will have drifted somewhat out of phase with the restored received signal. The phase-locked loop will bring the locally generated or the received difference frequency signals back into phase. If the loss of reception has not lasted so long that these two signals have drifted one-half of a cycle out of phase, the phase shift introduced by the digital comparator 41 will be proper to continue homodyne demodulation without a second start-up sequence.

It should be understood that the above-described arrangement is simply illustrative of the application of the principles of this invention. Numerous other arrangements employing the principles of this invention will be readily apparent to those skilled in the art.

What is claimed is:

1. A circuit for providing an output signal phase shifted with respect to an input signal including:

means for generating a clock signal;

a first multistate counting circuit normally advanced by said first clock signal to provide a counter output signal in accordance with the state of said counting circuit;

means for phase locking said counting circuit to said input signal;

a second multistate counter circuit for storing information indicative of a predetermined value of said counter output signal;

means rendered effective by said second counter circuit to provide a coincidence signal in response to said counter output signal assuming said predetermined value; and an output counting circuit controlled by said coincidence signal for providing said output signal.

2. The circuit as defined in claim 1 wherein said means for phase locking said first counting circuit to said input signal includes an input counter stage; and a single stage counter is employed as said output counting circuit.

3. The circuit as defined in claim 1 wherein said means for phase locking said first, counting circuit to said input signal includes:

means responsive to the amplitude of said input signal falling below a predetermined minimum value for rendering said phase locking means inoperative.

4. The circuit as defined in claim 3 wherein said second counter is responsive to a control signal for setting said predetermined value.

5. The circuit as defined in claim 4 also including:

means responsive to the amplitude of said counter signal falling below a predetermined minimum value for inhibiting said control signal.

References Cited

UNITED STATES PATENTS

| | | | |
|---|---|---|---|
| 2,549,505 | 4/1951 | Mohr | 328—155 X |
| 2,923,820 | 2/1960 | Liguori et al. | 328—155 |
| 3,045,186 | 7/1962 | Mechelen | 328—55 |
| 3,078,344 | 2/1963 | Crafts et al. | 328—155 X |

DONALD D. FORRER, Primary Examiner

B. P. DAVIS, Assistant Examiner

U.S. Cl. X.R.

328—55, 133